(No Model.) 2 Sheets—Sheet 1.

J. & H. M. GOODMAN.
WATER OR GAS METER.

No. 474,241. Patented May 3, 1892.

Witnesses
Paul W. Stevens
Phil O. Masi

Inventors
John Goodman
H. M. Goodman
By their Attorney
E. W. Anderson (No Model.) 2 Sheets—Sheet 2.
J. & H. M. GOODMAN.
WATER OR GAS METER.
No. 474,241. Patented May 3, 1892.
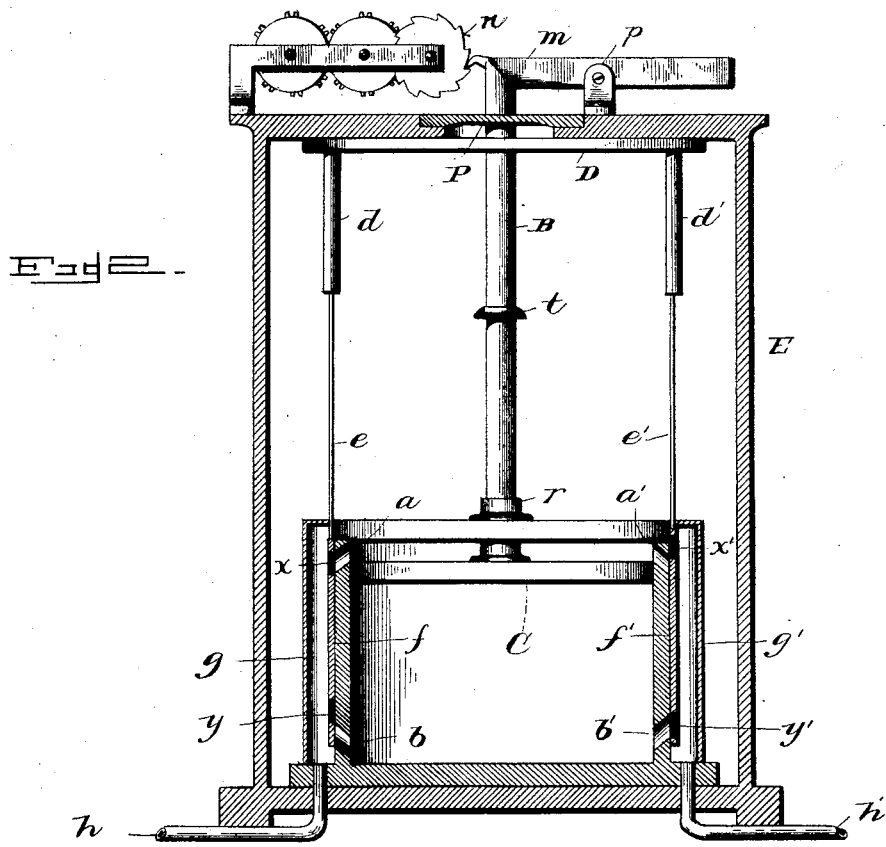
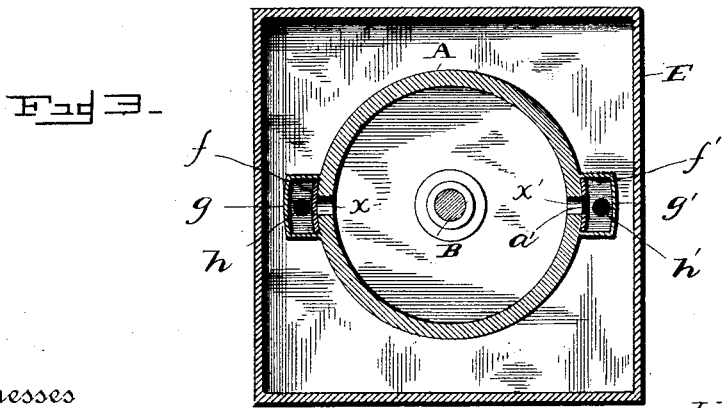
Witnesses
Paul W. Stevens
Phil C. Masi
Inventors
John Goodman
H. M. Goodman
By their Attorney
E. W. Anderson

UNITED STATES PATENT OFFICE.

JOHN GOODMAN AND HENRY M. GOODMAN, OF LOUISVILLE, KENTUCKY.

WATER OR GAS METER.

SPECIFICATION forming part of Letters Patent No. 474,241, dated May 3, 1892.

Application filed December 31, 1891. Serial No. 416,645. (No model.)

*To all whom it may concern:*

Be it known that we, JOHN GOODMAN and HENRY M. GOODMAN, citizens of the United States, and residents of Louisville, in the county of Jefferson and State of Kentucky, have invented certain new and useful Improvements in Water or Gas Meters; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
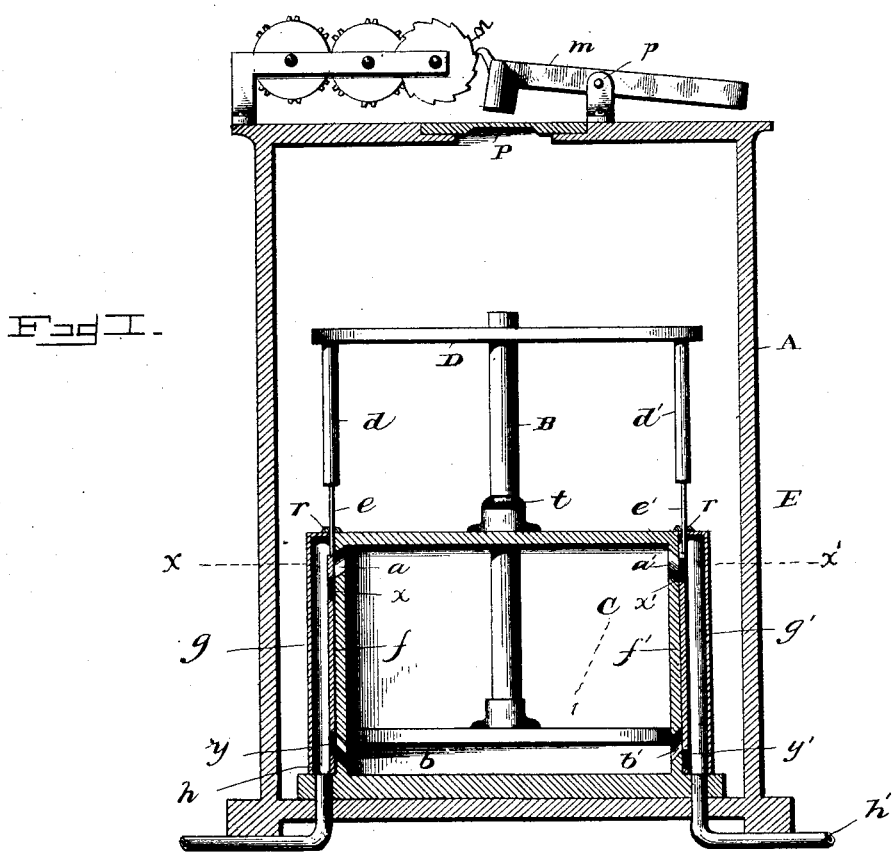
Figures 4, 5:
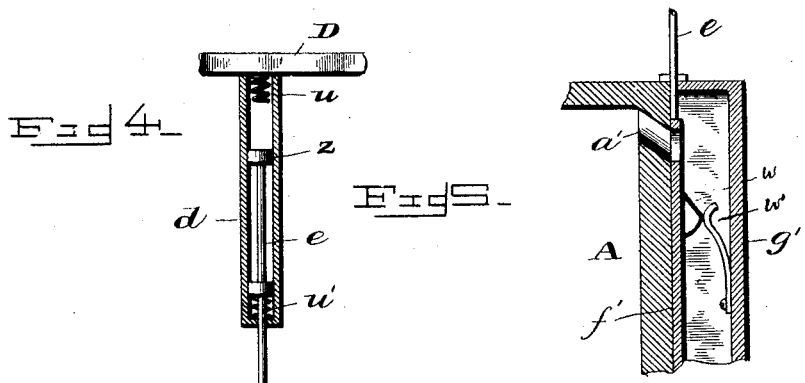

Figure 1 of the drawings is a vertical section of the apparatus as a whole, showing piston down. Fig. 2 is a similar view with piston raised. Fig. 3 is a horizontal section taken on dotted line $x\ x$. Fig. 4 is a detail section of one of the arms fixed to the beam D, and Fig. 5 is a sectional detail of the chamber A and slide-valve with spring.

This invention relates to meters for water or gas; and it consists in the novel construction and combination of parts, as hereinafter specified.

In Fig. 1, A A represent the cylinder or chamber of a water or gas meter motor.

B is the rod of the piston formed of a bar of magnetized steel, which at its lower extremity is screwed into the piston C and at its upper extremity is extended, so that when it is lifted to its utmost limit by the pressure of the water or gas below the piston it will come gently in contact with the brass plate P.

$a\ a'$ are ports into the chamber or cylinder above the piston, and $b\ b'$ are ports below it.

D is a beam attached to the piston-rod near its upper end, and $d\ d'$ are two arms firmly fixed to the horizontal beam D, just a little without and beyond the wall of the cylinder. From these descend the rods $e$ and $e'$, which are connected with the slide-valves $f$ and $f'$. These slide-valves have openings in them at $x$ and $x'$ and $y$ and $y'$, so arranged that when the piston C reaches the lowest part of the cylinder and the slide-valves are moved downward the opening at the lower extremity on one side at $y$ is brought in correspondence with the port of the cylinder at $b$, admitting the water or gas below the piston, the port at $b'$ being closed. At the same time the port at $a'$ is made to coincide with the opening $x$, permitting an outflow of the contents of the upper part of the cylinder, the port $a$ being closed. The result is that the piston is pushed upward until just as it reaches the upper ports the slide-valves are lifted and the action is reversed.

$g$ and $g'$ are the slide-valve boxes, the water or gas being admitted at $h$ and flowing out of the opposite box at $h'$.

If the rods $e$ and $e'$ were immovably fixed to the descending arms $d$ and $d'$ the movement of the slide-valves would be inconveniently great. In order to avoid this we have had recourse to the device shown in Fig. 4. $d$ is a side view of one of the descending arms. $e$ is the rod operating the slide-valve $f$, and which plays freely in a slot or aperture cut in the arm longitudinally. At its extremity there is a button $z$. When the arm has nearly reached its lowest point, the inner surface of the upper part of the slot strikes the button, pushing down the slide-valve. When it ascends, the inner surface of the lower part catches the button and lifts the valve. In order to insure the proper movement of the valve and to prevent the piston a sufficiently extreme movement to obstruct the ports at either end of the cylinder, the inner surface of each end of the slots or apertures in the arms $d\ d'$ are cushioned with a spring $u$ or $u'$, which by their compression insure the reversal of the valves before the piston reaches the line of the ports. The same thing may be accomplished by providing the valves with conical or rounded protuberances $w$, pressed upon by a spring $w'$, as shown in Fig. 3, said spring being attached to the inner surface of the valve-boxes or by other suitable devices.

E is an outer case hermetically sealed inclosing the motor apparatus. At a place upon its surface corresponding with that which the magnet B would touch is a plate P, of brass or other non-magnetic metal, thinned down at its center to as great a degree as is compatible with the pressure from within.

$m$ is an armature sustained by the arm $p$ on the outside of the enveloping case. It may consist of soft iron, or better, of a simple compound or electro magnet, with its opposite pole corresponding with that of the magnet on the inside and with its other pole sufficiently removed as to be beyond its repulsive action. It bears a catch or pawl which operates a ratchet-wheel $n$, and this in turn moves a set of dials which will indicate each rise and fall of the piston, for when the magnetized rod approaches the brass plate the armature will be attracted to it and when it recedes the armature will be liberated and raised by the force of a spring or by the action of gravity upon its distant extremity. The magnet within the chamber may be either simple or compound, or may be converted into an electro-magnet by an insulated wire passed through a hole in the outer case.

Instead of the piston-rod being magnetic a magnetized bar may be attached to any part of the movable machinery and worked directly by the action thereof or indirectly by means of cranks or levers. Although this plan of inclosing the meter-motor in an outer case and operating the dials by means of a magnet within it and an armature on the outside is described in connection with a special form of meter, it is applicable to any meter either positive or inferential.

$r\ r\ r$ are stuffing-boxes.

$t$ is a stop to prevent too great a descent of the piston.

The apparatus is here represented as acting perpendicularly, but it may be made to occupy any relative position to the horizon.

Having described our invention, what we claim as new, and desire to secure by Letters Patent, is—

1. A water or gas meter having two slide-valves operated in unison by the action of the piston or any mechanical device connected therewith having openings so arranged that when they are moved in one direction the pressure is brought to bear upon one side of the piston and when moved in the opposite direction the pressure is brought to bear on the other side and a magnet actuated by the piston, in combination with an armature influenced by said magnet and operating a register, substantially as specified.

2. In a gas or water meter hermetically sealed in a case or covering surrounding the motor mechanism, a magnet actuated to a to-and-fro movement by being connected directly or indirectly with the piston, in combination with an armature on the outside of the case, which being influenced by the movements of the magnet operates a set of dials, whereby the strokes of the piston are recorded and the quantity of the fluid which passes through is indicated, substantially as specified.

3. In a water or gas meter, the combination, with the slide-valves arranged to admit pressure alternately on opposite sides of a piston and the rods connected thereto, of the arms moving with the piston-rod and having apertures or slots therein in which said rods move freely to a certain extent, whereby the play of the valves is less than the movement of the piston, substantially as specified.

In testimony whereof we affix our signatures in presence of two witnesses.

JOHN GOODMAN,
HENRY M. GOODMAN.

Witnesses:
GEO. C. STAUBER,
M. B. LANDRAM.